US012625984B2

(12) United States Patent
Tadokoro et al.

(10) Patent No.: US 12,625,984 B2
(45) Date of Patent: *May 12, 2026

(54) DISPLAY CONTROL SYSTEM, DISPLAY CONTROL METHOD, AND DISPLAY CONTROL PROGRAM

(71) Applicant: NTT, Inc., Tokyo (JP)

(72) Inventors: Masashi Tadokoro, Tokyo (JP); Tomonori Mori, Tokyo (JP); Taisuke Wakasugi, Tokyo (JP); Akira Kataoka, Tokyo (JP); Haruo Oishi, Tokyo (JP)

(73) Assignee: NTT, Inc., Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 18/575,823

(22) PCT Filed: Jun. 30, 2021

(86) PCT No.: PCT/JP2021/024881
§ 371 (c)(1),
(2) Date: Dec. 30, 2023

(87) PCT Pub. No.: WO2023/276091
PCT Pub. Date: Jan. 5, 2023

(65) Prior Publication Data
US 2024/0354430 A1 Oct. 24, 2024

(51) Int. Cl.
| | |
|---|---|
| G06F 21/62 | (2013.01) |
| G06F 3/048 | (2013.01) |
| G06F 21/60 | (2013.01) |
| G06F 21/84 | (2013.01) |

(52) U.S. Cl.
CPC ............ *G06F 21/62* (2013.01); *G06F 21/602* (2013.01); *G06F 21/84* (2013.01)

(58) Field of Classification Search
CPC ........ G06F 21/62; G06F 21/602; G06F 21/84; G06F 21/6245; G06F 3/048
See application file for complete search history.

(56) References Cited

U.S. PATENT DOCUMENTS

| | | | | |
|---|---|---|---|---|
| 8,966,656 B2 * | 2/2015 | Hirsch | ...................... | H04L 9/12 |
| | | | | 713/168 |
| 9,330,272 B2 * | 5/2016 | Koo | ......................... | G06F 21/32 |
| 10,504,289 B2 * | 12/2019 | Yildiz | .................. | H04N 13/239 |
| 10,528,838 B1 * | 1/2020 | Carter, Jr. | ........... | G06Q 20/042 |
| 11,121,883 B1 * | 9/2021 | Webber | ............... | H04L 63/0263 |

(Continued)

FOREIGN PATENT DOCUMENTS

| | | |
|---|---|---|
| JP | 2015184762 A | 10/2015 |
| JP | 2017072872 A | 4/2017 |
| JP | 2018092228 A | 6/2018 |

*Primary Examiner* — Darren B Schwartz

(57) ABSTRACT

A work terminal (10) that displays a web screen displays an ID marker indicating confidential information in an allocation area of the confidential information on the web screen. Thereafter, smart glasses (20) worn by a worker of the work terminal (10) read an ID marker displayed on the web screen of the work terminal (10). Then, the smart glasses (20) acquire confidential information corresponding to the read ID marker from a DB that stores confidential information corresponding to the ID marker, and display the confidential information on a screen unit of the smart glasses (20).

20 Claims, 15 Drawing Sheets

1 DISPLAY CONTROL SYSTEM
10 WORK TERMINAL
ID MARKER (UI COMPONENT)
ID MARKER INCLUDING ENCRYPTED CONFIDENTIAL INFORMATION
20 SMART GLASSES
ID MARKER (UI COMPONENT)
CONFIDENTIAL INFORMATION DELIVERY PERFORMANCE SSS

ENCRYPTED CONFIDENTIAL INFORMATION INCLUDED IN ID MARKER IS READ,
READ ENCRYPTED CONFIDENTIAL INFORMATION IS DECRYPTED,
AND DECRYPTED CONFIDENTIAL INFORMATION IS DISPLAYED ON SMART GLASSES

(56) References Cited

U.S. PATENT DOCUMENTS

| | | | |
|---|---|---|---|
| 11,954,194 B1 * | 4/2024 | Wu ..................... | G06F 21/6209 |
| 2013/0307870 A1 * | 11/2013 | Ashbrook .............. | G06F 21/84 |
| | | | 345/418 |
| 2015/0269331 A1 * | 9/2015 | Bolanos ................. | G06F 21/34 |
| | | | 705/51 |
| 2017/0124349 A1 * | 5/2017 | Anantapur Bache ... | G06F 21/44 |
| 2017/0161506 A1 * | 6/2017 | Gates ....................... | G09C 5/00 |
| 2018/0189505 A1 * | 7/2018 | Ghafourifar ........ | G06F 21/6209 |
| 2019/0149335 A1 * | 5/2019 | Kim ......................... | G09C 5/00 |
| | | | 713/155 |
| 2020/0258428 A1 * | 8/2020 | Forte ........................ | H04L 9/50 |

* cited by examiner

Fig. 1

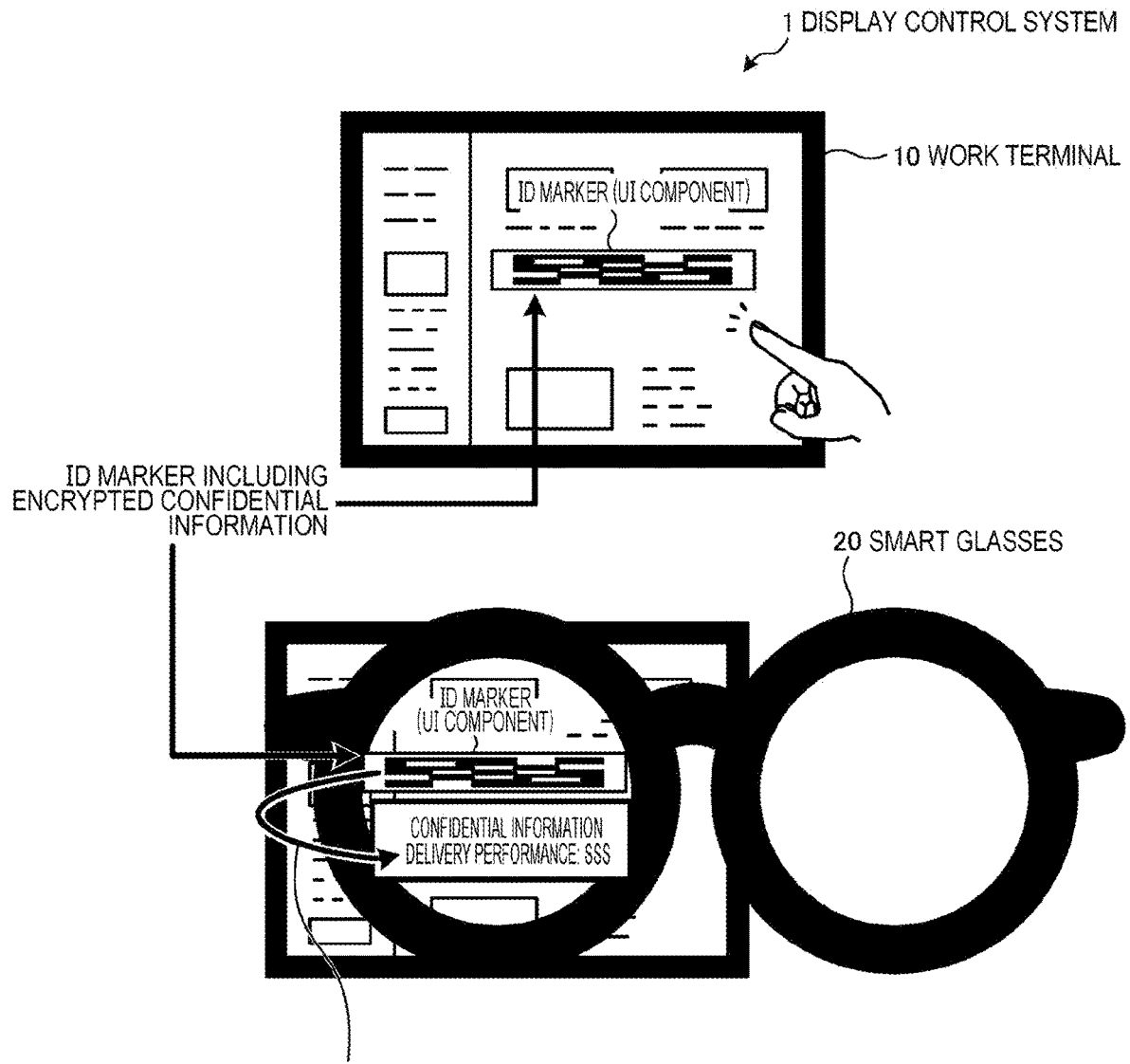

1 DISPLAY CONTROL SYSTEM

10 WORK TERMINAL

ID MARKER (UI COMPONENT)

ID MARKER INCLUDING ENCRYPTED CONFIDENTIAL INFORMATION

20 SMART GLASSES

ID MARKER (UI COMPONENT)

CONFIDENTIAL INFORMATION DELIVERY PERFORMANCE: SSS

ENCRYPTED CONFIDENTIAL INFORMATION INCLUDED IN ID MARKER IS READ, READ ENCRYPTED CONFIDENTIAL INFORMATION IS DECRYPTED, AND DECRYPTED CONFIDENTIAL INFORMATION IS DISPLAYED ON SMART GLASSES

Fig. 5
1a DISPLAY CONTROL SYSTEM
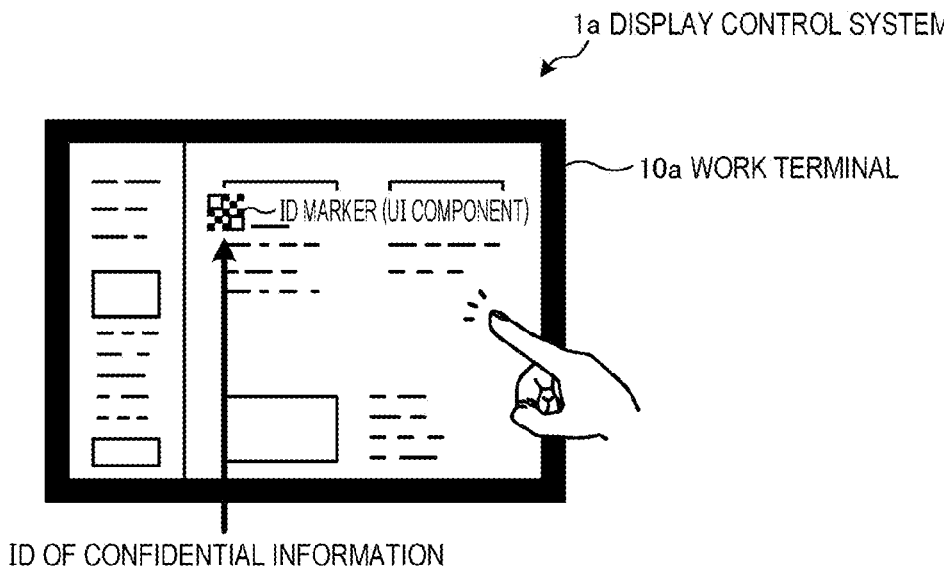
10a WORK TERMINAL
ID MARKER (UI COMPONENT)
ID OF CONFIDENTIAL INFORMATION
20a SMART GLASSES
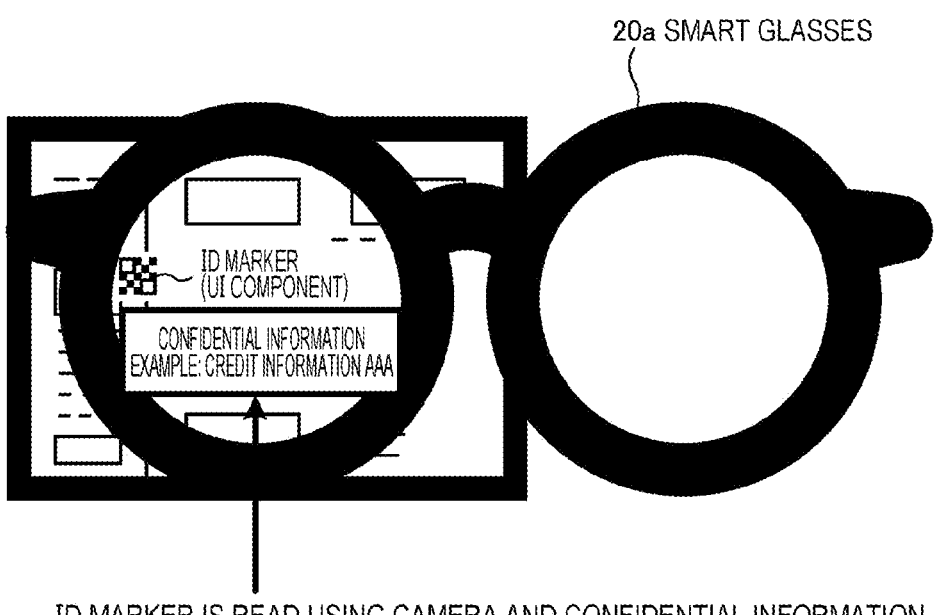
ID MARKER
(UI COMPONENT)
CONFIDENTIAL INFORMATION
EXAMPLE: CREDIT INFORMATION AAA
ID MARKER IS READ USING CAMERA AND CONFIDENTIAL INFORMATION
OF CORRESPONDING ID IS DISPLAYED ON SMART GLASSES

Fig. 13

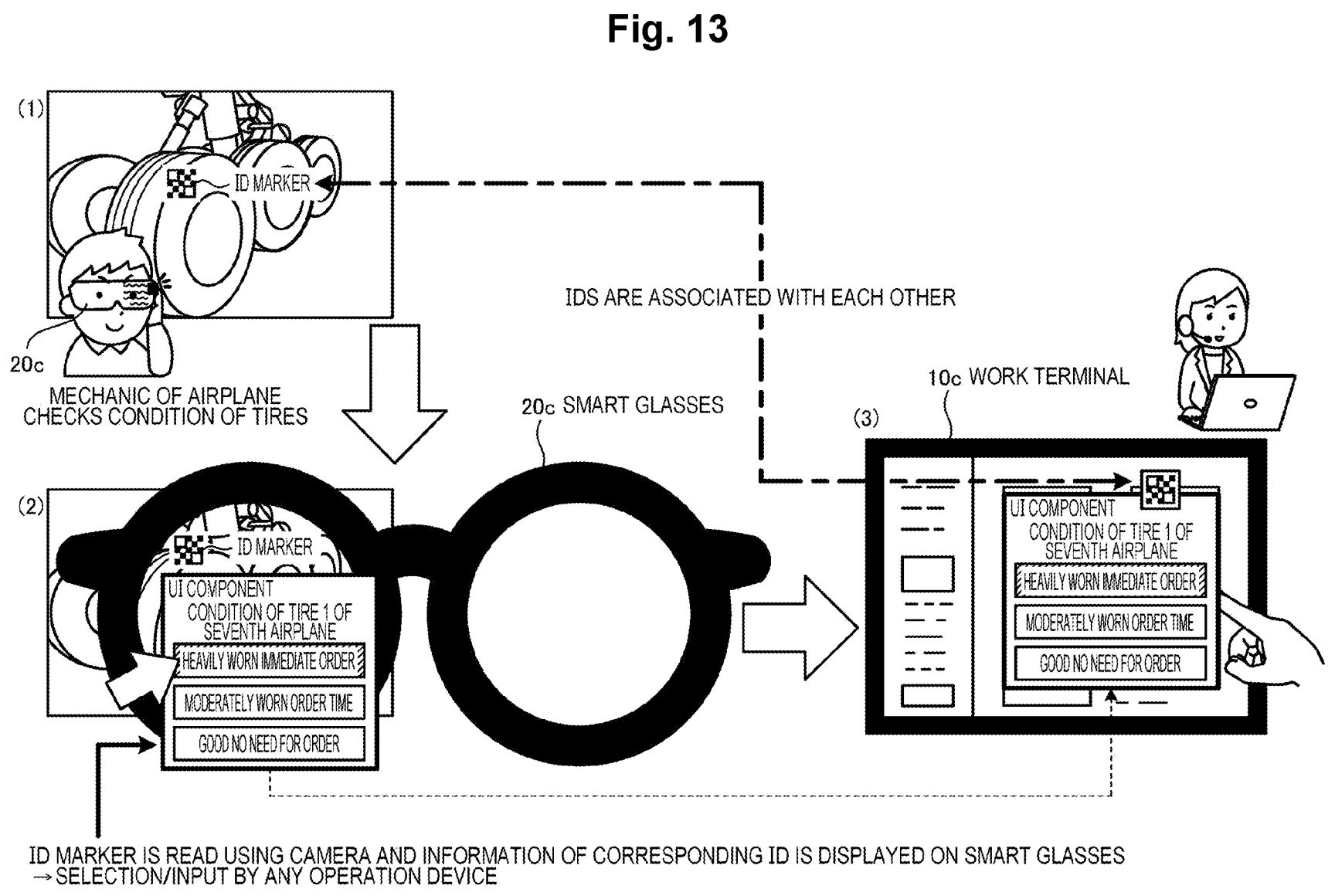

(1) MECHANIC OF AIRPLANE CHECKS CONDITION OF TIRES

20c

ID MARKER

IDS ARE ASSOCIATED WITH EACH OTHER

10c WORK TERMINAL (3)

UI COMPONENT
CONDITION OF TIRE 1 OF SEVENTH AIRPLANE

HEAVILY WORN IMMEDIATE ORDER

MODERATELY WORN ORDER TIME

GOOD NO NEED FOR ORDER

20c SMART GLASSES (2)

UI COMPONENT
CONDITION OF TIRE 1 OF SEVENTH AIRPLANE

ID MARKER

HEAVILY WORN IMMEDIATE ORDER

MODERATELY WORN ORDER TIME

GOOD NO NEED FOR ORDER

ID MARKER IS READ USING CAMERA AND INFORMATION OF CORRESPONDING ID IS DISPLAYED ON SMART GLASSES
→ SELECTION/INPUT BY ANY OPERATION DEVICE

Fig. 14

DISPLAY CONTROL SYSTEM, DISPLAY CONTROL METHOD, AND DISPLAY CONTROL PROGRAM

CROSS-REFERENCE TO RELATED APPLICATIONS

This application is a U.S. 371 Application of International Patent Application No. PCT/JP2021/024881, filed on 30 Jun. 2021, the disclosure of which is hereby incorporated herein by reference in its entirety.

TECHNICAL FIELD

The present invention relates to a display control system, a display control method, and a display control program for performing display control of confidential information.

BACKGROUND ART

Conventionally, there is a technology (user interface (UI) extension technology) in which an extension UI is displayed in an overlay manner on a web screen to extend a function without modifying an existing system (see Patent Literature 1).

CITATION LIST

Patent Literature

Patent Literature 1: JP 2017-72872 A

SUMMARY OF INVENTION

Technical Problem

In a case where confidential information such as personal information or in-house confidential information is included in a UI component displayed by the UI extension technology in a system to which the UI extension technology is applied, display of the confidential information on a web screen of a terminal may be prohibited depending on the environment of the terminal that displays the web screen of the system. In such a case, a worker of the system needs to confirm confidential information by another means, which causes a decrease in work efficiency.

Therefore, an object of the present invention is to solve the above-described issue and to eliminate the need to confirm confidential information by another means by a worker of a system.

Solution to Problem

In order to solve the above issue, the present invention is a display control system including a work terminal that displays a web screen, and a mobile terminal with a camera carried by a worker of the work terminal, in which the work terminal includes a first display control unit that displays an ID marker indicating confidential information in an allocation area of the confidential information on the web screen, and the mobile terminal includes, an image acquisition unit that acquires an image of the web screen, a reading unit that reads an ID marker displayed on the web screen using an acquired image of the web screen, an acquisition unit that acquires confidential information corresponding to the read ID marker from a DB that stores confidential information corresponding to the ID marker, and a second display control unit that displays the acquired confidential information on a screen unit.

Advantageous Effects of Invention

According to the present invention, the need to confirm confidential information by another means by a worker of a system can be eliminated.

BRIEF DESCRIPTION OF DRAWINGS

FIG. 1 is a diagram for describing an outline of a display control system of a first embodiment.

FIG. 5 is a diagram for describing an outline of a display control system of a second embodiment.

FIG. 13 is a diagram illustrating an application example of the display control system of the fourth embodiment.

FIG. 14 is a diagram illustrating an application example of the display control system of the fourth embodiment.

DESCRIPTION OF EMBODIMENTS

Hereinafter, modes (embodiments) for carrying out the present invention will be described separately from a first embodiment to a fourth embodiment with reference to the drawings. The present invention is not limited to the embodiments described below.

Hereinafter, a case where a mobile terminal carried by a worker of a work terminal is smart glasses will be described as an example, but the present invention is not limited thereto. For example, the mobile terminal may be a mobile terminal with a camera (for example, smartphone with a camera or the like).

Furthermore, confidential information is information that is not preferable to be displayed on a web screen, such as personal information and in-house confidential information, and is information that facilitates work on a web screen in business in a case where a worker can view the information. It is assumed that the confidential information is information separable from a web system that provides a web screen. Furthermore, the confidential information is information that can be displayed using the above-described extended UI of a web screen.

First Embodiment

Outline

First, an outline of a display control system 1 of a first embodiment will be described with reference to FIG. 1. The display control system 1 includes a work terminal 10 and smart glasses 20 worn by a worker of the work terminal 10. The work terminal 10 and the smart glasses 20 are communicably connected by wireless communication or the like. The work terminal 10 displays a screen (web screen) of a web system, and displays an extended user interface (UI) in an overlay manner on a UI included in the web screen.

Here, the work terminal 10 displays an ID marker (UI component) including encrypted confidential information on the web screen by the above-described extended UI. The ID marker is, for example, a two-dimensional code such as a QR code (registered trademark). When a worker views the web screen of the work terminal 10 through the smart glasses 20, the smart glasses 20 read the encrypted confidential information included in the ID marker, decrypt the read encrypted confidential information, and display the read encrypted confidential information on the smart glasses 20.

Accordingly, the display control system 1 can display confidential information on the smart glasses 20 of a worker without displaying the confidential information on a web screen of the work terminal 10. As a result, although a person other than a worker cannot view confidential information, the worker can perform work on a web screen while viewing the confidential information through the smart glasses 20. Accordingly, a worker can improve efficiency when performing work on a web screen.

Configuration Example

Figure 2:
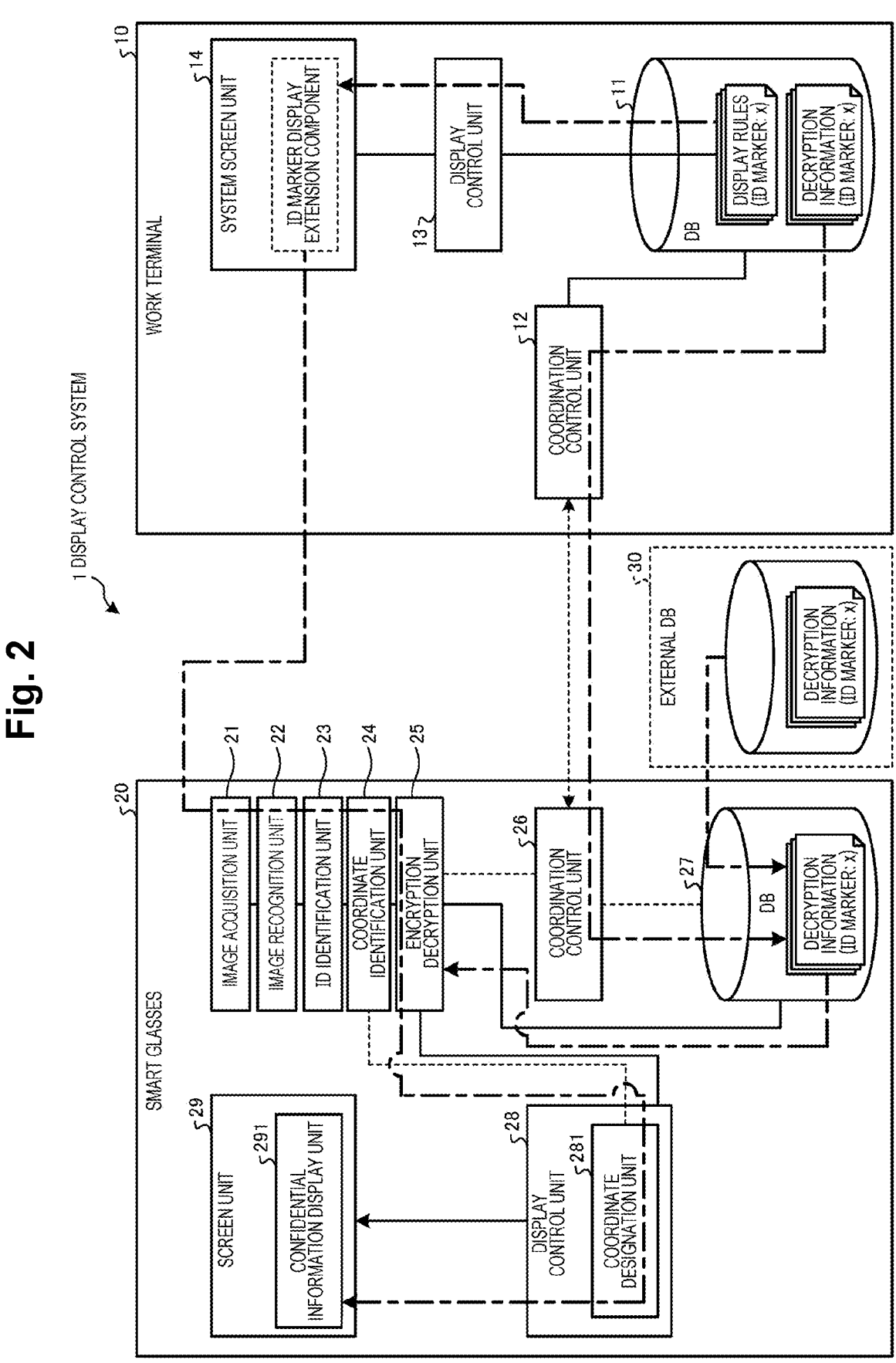
FIG. 2 is a diagram illustrating a configuration example of the display control system of the first embodiment.

Next, a configuration example of the display control system 1 will be described with reference to FIG. 2. As described above, the display control system 1 includes the work terminal 10 and the smart glasses 20. An external DB 30 may be equipped or may not be equipped, and a case where the external DB 30 is equipped will be described below.

Work Terminal

First, the work terminal 10 will be described. The work terminal 10 includes a database (DB) 11, a coordination control unit 12, a display control unit (first display control unit) 13, and a system screen unit 14.

The DB 11 stores display rules and decryption information. The display rules are information indicating rules for displaying an ID marker on a web screen.

The display rules include, for example, (1) a displayed extended UI (encryption information of confidential information, identification information (ID marker) of the encryption information, and the like), (2) display position information of the extended UI (for example, corresponding URL, specific text, text box, HTML information, image information, and the like), (3) confidential information, and the like.

Furthermore, the decryption information is information serving as a decryption key of the encryption information of the confidential information. The decryption information is stored in association with the identification information (ID)

of the encryption information. The DB 11 is equipped in a predetermined area of a storage unit (not illustrated) of the work terminal 10.

Note that the work terminal 10 may encrypt confidential information when the confidential information is stored in the DB 11, or may encrypt confidential information when the confidential information is displayed on a web screen.

The coordination control unit 12 coordinates information with other devices via a network. For example, the coordination control unit 12 transmits decryption information of an ID marker in the DB 11 to the smart glasses 20.

The display control unit 13 performs display control of the system screen unit 14. For example, the display control unit 13 displays an ID marker indicating encryption information of confidential information in an allocation area of the confidential information on the web screen using an extended UI (extension component) on the basis of the above display rules.

The system screen unit 14 displays a screen on the basis of display control by the display control unit 13. For example, the system screen unit 14 displays a web screen including an extension component of an ID marker (ID marker display extension component) on the basis of display control by the display control unit 13.

Smart Glasses

Next, the smart glasses 20 will be described. The smart glasses 20 include an image acquisition unit 21, an image recognition unit 22, an ID identification unit (reading unit) 23, a coordinate identification unit 24, an encryption decryption unit (acquisition unit) 25, a coordination control unit 26, a DB 27, a display control unit (second display control unit) 28, and a screen unit 29.

The image acquisition unit 21 acquires an image of a web screen displayed on the work terminal 10. For example, the image acquisition unit 21 acquires an image of a web screen by the camera of the smart glasses 20. The image recognition unit 22 recognizes an image of a web screen acquired by the image acquisition unit 21. For example, the image recognition unit 22 recognizes an ID marker on a web screen. The ID identification unit 23 identifies content (for example, ID of encryption information and the encryption information) described in an ID marker recognized by the image recognition unit 22. The coordinate identification unit 24 identifies the coordinate position of an ID marker on a web screen acquired by the image acquisition unit 21.

The encryption decryption unit 25 decrypts encryption information identified by the ID identification unit 23 using decryption information acquired from the DB 27. For example, the encryption decryption unit 25 acquires decryption information of encryption information from the DB 27 using an ID of the encryption information (ID of confidential information) identified by the ID identification unit 23 as a key. Then, the encryption decryption unit 25 decrypts the encryption information using the acquired decryption information. Thereafter, the encryption decryption unit 25 outputs the decrypted information (confidential information) to the display control unit 28.

The coordination control unit 26 coordinates information with other devices via a network. For example, the coordination control unit 26 stores decryption information received from the work terminal 10 in the DB 27.

The DB 27 stores decryption information acquired by the coordination control unit 26. Note that the decryption information is stored in the DB 27 in association with an ID of encryption information to be decrypted (ID of confidential information).

Note that the decryption information may be stored in the DB 27 or may be stored in a device outside the smart glasses 20 (external DB 30). In a case where decryption information is stored in the external DB 30, the encryption decryption unit 25 acquires the decryption information from the external DB 30 using the coordination control unit 26.

The display control unit 28 performs display control of the screen unit 29. For example, the display control unit 28 displays confidential information output by the encryption decryption unit 25 in a predetermined area of the screen unit 29. The display control unit 28 includes a coordinate designation unit 281.

The coordinate designation unit 281 designates a coordinate position of confidential information on the screen unit 29 on the basis of a coordinate position of an ID marker identified by the coordinate identification unit 24. The display control unit 28 displays the confidential information at the coordinate position designated by the coordinate designation unit 281.

For example, the coordinate designation unit 281 designates a coordinate position of confidential information at a position within a predetermined distance from a position of a corresponding ID marker when a worker (wearer of the smart glasses 20) views a web screen on the work terminal 10 through the screen unit 29. Then, the display control unit 28 displays the confidential information at the coordinate position designated by the coordinate designation unit 281.

The screen unit 29 displays a screen on the basis of display control by the display control unit 28. The screen unit 29 is transparent, for example, and a wearer of the smart glasses 20 can view a web screen on the work terminal 10 through the screen unit 29. The screen unit 29 includes a confidential information display unit 291. The confidential information display unit 291 displays confidential information at a coordinate position designated by the coordinate designation unit 281.

Example of Processing Procedure

Figure 3:
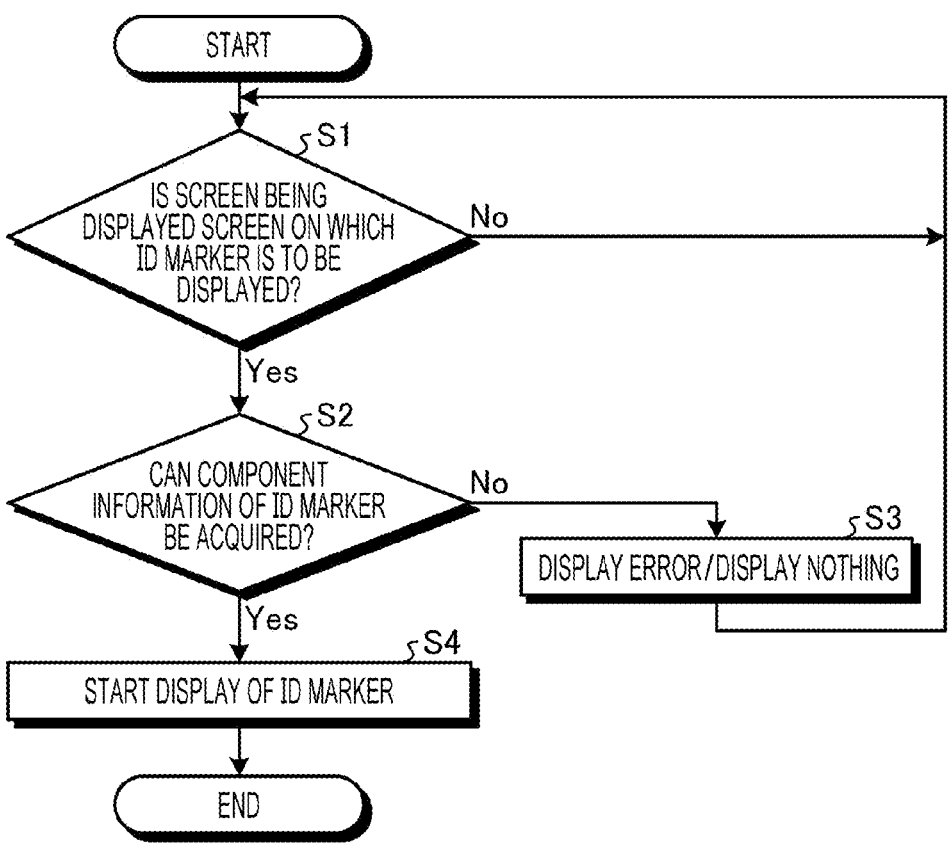
FIG. 3 is a flowchart illustrating an example of a processing procedure of a work terminal of FIG. 2.

Next, an example of a processing procedure of the display control system 1 will be described. First, an example of a processing procedure of the work terminal 10 will be described with reference to FIG. 3.

The display control unit 13 of the work terminal 10 determines whether a screen being displayed on the system screen unit 14 is a screen on which an ID marker is to be displayed (S1). For example, the display control unit 13 refers to the display rules and determines whether the URL of the web screen being displayed on the system screen unit 14 is a URL in which an ID marker is to be displayed.

Here, in a case where the display control unit 13 determines that the screen being displayed is a screen on which an ID marker is to be displayed (Yes in S1), and component information of the ID marker (for example, encryption information, ID of encryption information, display position of ID marker, and the like) can be acquired from the display rules in the DB 11 (Yes in S2), the display control unit 13 starts display of the ID marker on the web screen on the basis of the acquired component information of the ID marker (S4).

On the other hand, in a case where the display control unit 13 determines that the screen being displayed is not a screen on which an ID marker is to be displayed (No in S1), the processing returns to S1. In a case where the display control unit 13 cannot acquire the component information of the ID marker from the display rules in the DB 11 (No in S2), an error is displayed on the system screen unit 14 or nothing is displayed (S3), and the processing returns to S1.

In this way, the work terminal 10 can display the ID marker indicating encryption information of confidential information on a web screen.

Figure 4:
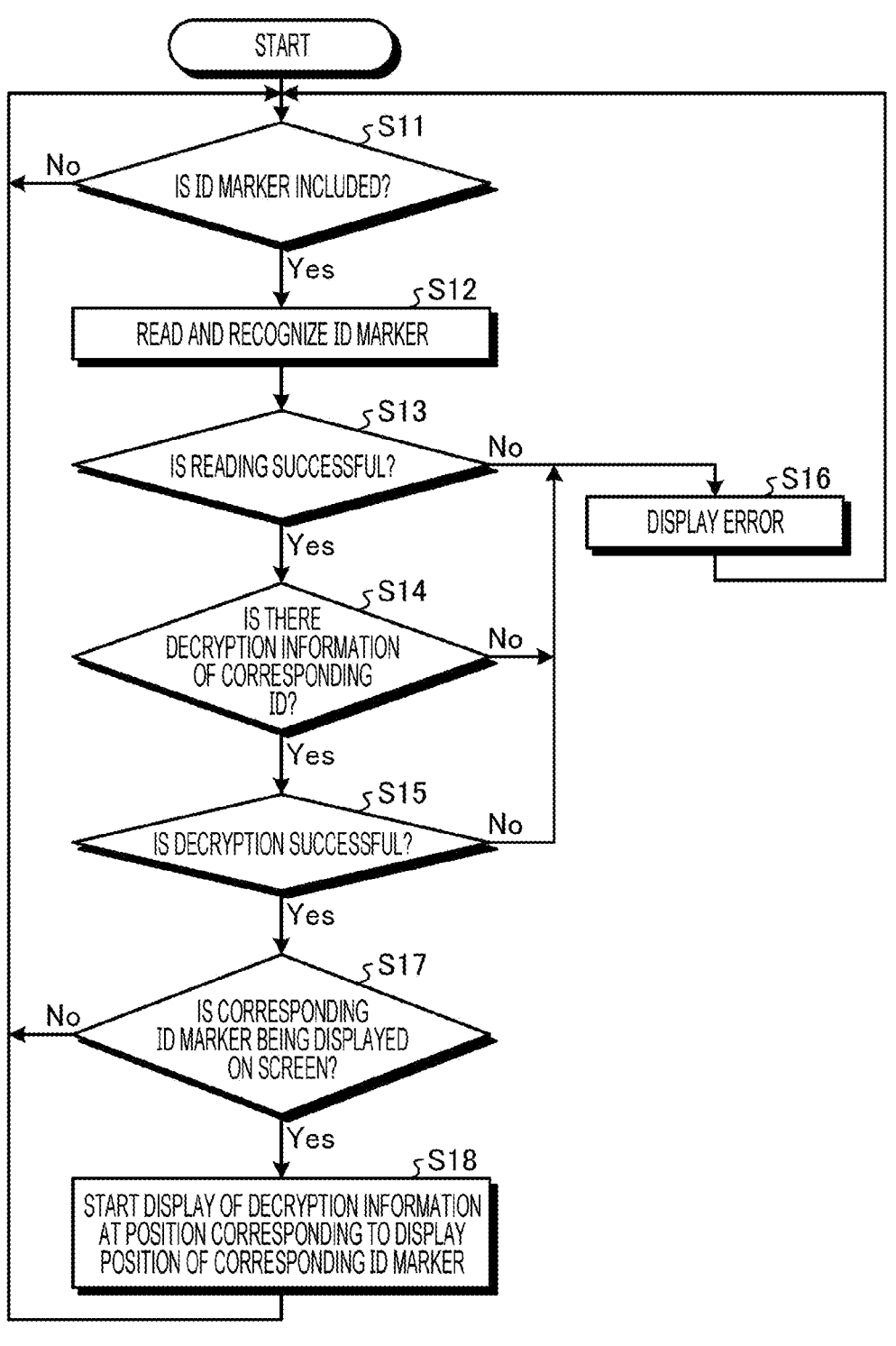
FIG. 4 is a flowchart illustrating an example of a processing procedure of smart glasses of FIG. 2.

Next, an example of a processing procedure of the smart glasses 20 will be described with reference to FIG. 4. In a case where an ID marker is included in an image acquired by the image acquisition unit 21 (Yes in S11), the smart glasses 20 read and recognize the ID marker (S12). That is, the image recognition unit 22 of the smart glasses 20 recognizes the ID marker on the web screen. Then, the ID identification unit 23 of the smart glasses 20 identifies content described in the ID marker (encryption information and an ID of the encryption information).

When the smart glasses 20 have successfully read the ID marker (Yes in S13), the encryption decryption unit 25 determines whether decryption information of the corresponding ID (that is, the ID of the encryption information) is in the DB 27 (S14). On the other hand, in a case where the smart glasses 20 fail to read the ID marker (No in S13), the display control unit 28 displays an error on the system screen unit 14 (S16).

In a case where the encryption decryption unit 25 determines in S14 that the decryption information of the corresponding ID is in the DB 27 (Yes in S14), decrypting the encryption information is attempted using the decryption information. Here, in a case where the encryption decryption unit 25 succeeds in decrypting the encryption information (Yes in S15), the display control unit 28 determines whether the ID marker is still being displayed on the web screen on the basis of the image acquired by the image acquisition unit 21 (S17). That is, the display control unit 28 checks whether the ID marker is scrolled out from the web screen or the web screen displaying the ID marker is switched to another screen.

Here, in a case where the display control unit 28 determines that the ID marker is still being displayed on the web screen (Yes in S17), the display control unit 28 starts display of the decryption information (confidential information) at a position corresponding to the display position of the ID marker on the web screen (S18). For example, on the basis of the position of the ID marker on the web screen acquired by the image acquisition unit 21, the display control unit 28 starts display of the confidential information at a position within a predetermined distance from the position of the ID marker when a worker views the web screen through the screen unit 29 of the smart glasses 20.

On the other hand, in a case where the display control unit 28 determines that the ID marker is not displayed on the web screen (No in S17), the processing returns to S11. In a case where the encryption decryption unit 25 determines that the decryption information of the corresponding ID is not in the DB 27 in S14 (No in S14) or in a case where the encryption decryption unit 25 fails to decrypt the encryption information (No in S15), the display control unit 28 displays an error on the system screen unit 14 (S16). Then, the processing returns to S11.

In this way, the smart glasses 20 can read an ID marker from a web screen, decrypt encryption information indicated by the ID marker, and display confidential information.

Second Embodiment

Note that the above information described in an ID marker may be an ID of confidential information. An embodiment in this case will be described as a second embodiment. The same configurations as those of the first embodiment are denoted by the same reference signs, and description thereof is omitted.

As illustrated in FIG. 5, a display control system 1*a* of the second embodiment includes a work terminal 10*a* and smart glasses 20*a*. The work terminal 10*a* displays an ID marker in which an ID of confidential information is described on a web screen. Then, the smart glasses 20*a* read the ID marker on the web screen displayed on the work terminal 10*a* using a camera, search a DB for confidential information of the corresponding ID (ID described in the ID marker), and display the confidential information on the smart glasses 20*a*.

Configuration Example

Figure 6:
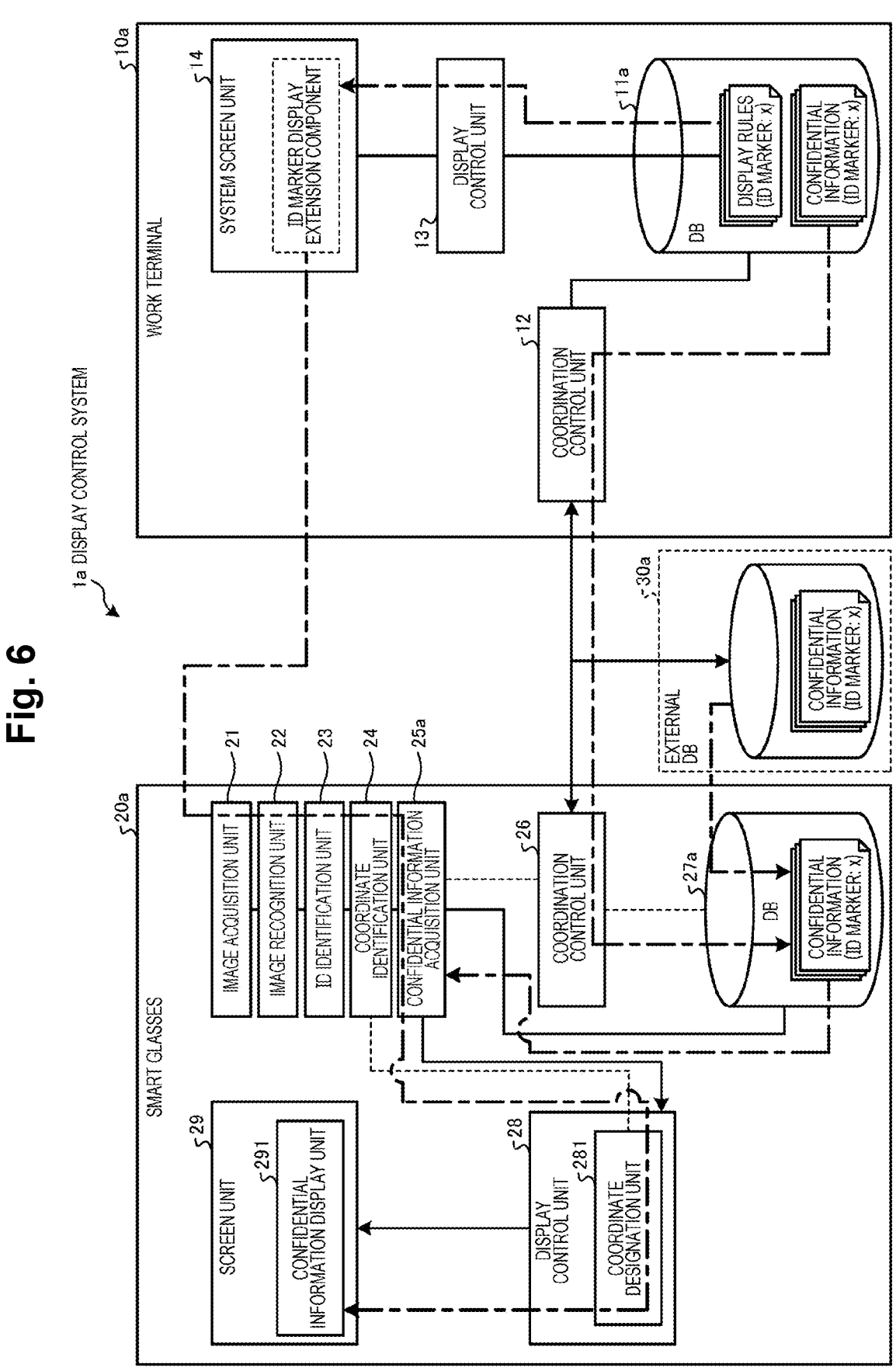
FIG. 6 is a diagram illustrating a configuration example of the display control system of the second embodiment.

Next, a configuration example of a display control system 1*a* will be described with reference to FIG. 6. The same configurations as those of the first embodiment are denoted by the same reference signs, and description thereof is omitted. As described above, the display control system 1*a* includes the work terminal 10*a* and the smart glasses 20*a*. An external DB 30*a* may be equipped or may not be equipped, and a case where the external DB is equipped will be described below.

Work Terminal

The work terminal 10*a* includes a DB 11*a*. The DB 11*a* stores display rules of an ID marker and confidential information. The display rules include, for example, (1) a displayed extended UI (ID of confidential information (ID marker)) in addition to (2) display position information of the extended UI described in the first embodiment.

The confidential information is confidential information displayed on the smart glasses 20*a*, and is stored in the DB 11*a* in association with the ID of the confidential information. Note that the confidential information may include information such as display position information (for example, display is performed immediately below the ID marker on the screen), font size, color, and the like of the confidential information on the smart glasses 20*a*. The DB 11*a* is equipped in a predetermined area of a storage unit (not illustrated) of the work terminal 10*a*.

A coordination control unit 12 of the work terminal 10*a* transmits confidential information stored in the DB 11*a* to the smart glasses 20*a*. A coordination control unit 26 of the smart glasses 20*a* stores confidential information transmitted from the work terminal 10*a* in a DB 27*a*.

Smart Glasses

The smart glasses 20*a* include a confidential information acquisition unit 25*a* and the DB 27*a*. The confidential information acquisition unit 25*a* acquires confidential information corresponding to an ID indicated by an ID marker from the DB 27*a* and outputs the confidential information to the display control unit 28. The DB 27*a* stores confidential information acquired by the coordination control unit 26 in association with the ID of the confidential information.

Note that the confidential information may be stored in the DB 27*a* in the smart glasses 20*a* or may be stored in a device outside the smart glasses 20*a* (external DB 30*a*). In a case where the confidential information is stored in the external DB 30*a*, the confidential information acquisition unit 25*a* acquires the confidential information from the external DB 30*a* via the coordination control unit 26.

Example of Processing Procedure

Figure 7:
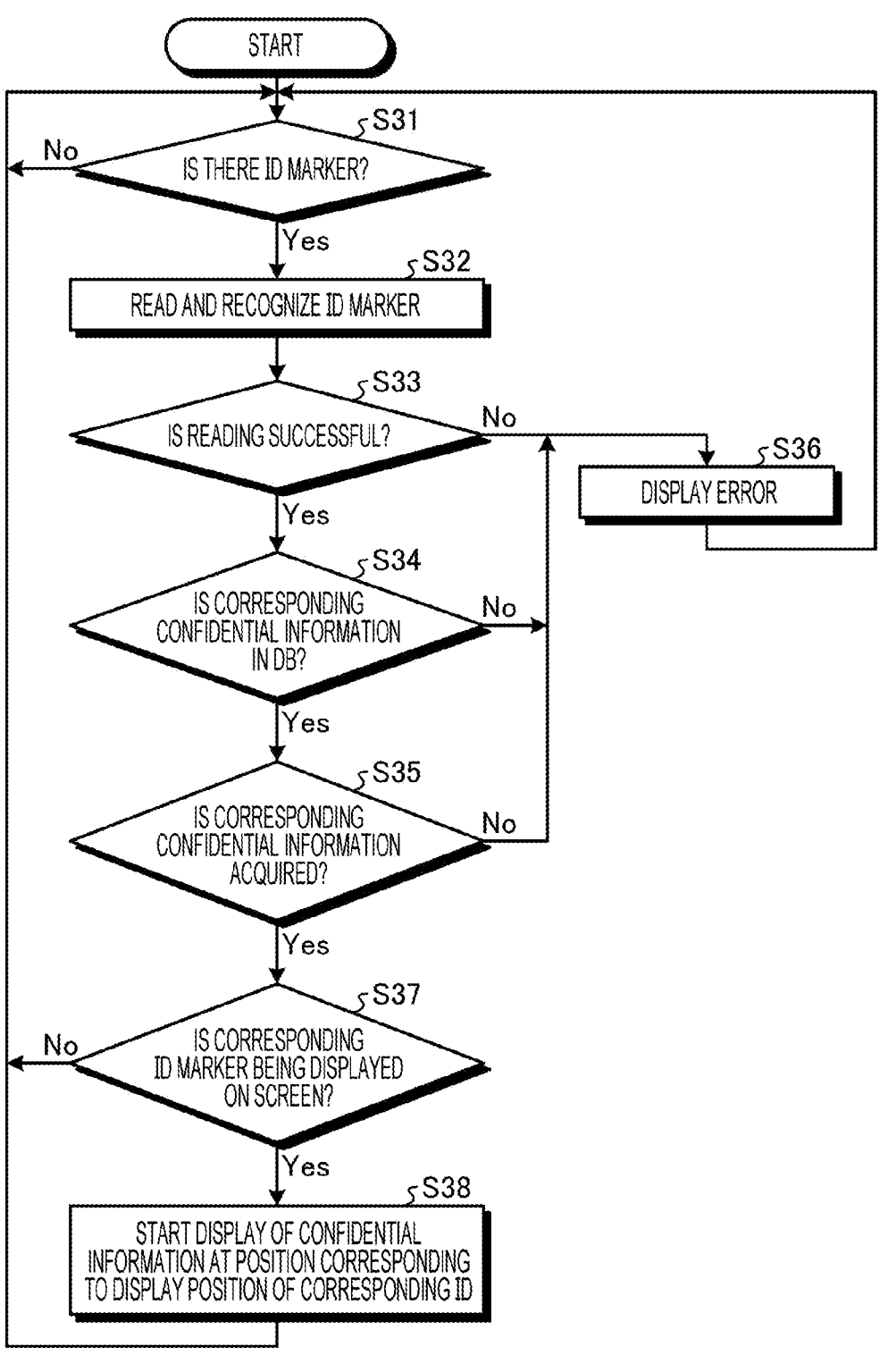
FIG. 7 is a flowchart illustrating an example of a processing procedure of smart glasses of FIG. 6.

Next, an example of a processing procedure of the display control system 1*a* will be described. Since a processing procedure of the work terminal 10*a* is substantially the same as that of the work terminal 10, description thereof is omitted, and an example of a processing procedure of the smart glasses 20*a* will be described with reference to FIG. 7.

In a case where an ID marker is included in an image acquired by an image acquisition unit 21 (Yes in S31), the smart glasses 20*a* read and recognize the ID marker (S32). That is, the smart glasses 20*a* identify content described in the ID marker (ID of confidential information).

When the smart glasses 20*a* have successfully read the ID marker in S32 (Yes in S33), the confidential information acquisition unit 25*a* determines whether corresponding confidential information is in the DB 27*a* (S34). For example, the encryption decryption unit 25 determines whether confidential information associated with the corresponding ID is in the DB 27*a* using the ID of the confidential information as a key. On the other hand, in a case where the smart glasses 20*a* fail to read the ID marker (No in S33), the display control unit 28 displays an error on a system screen unit 14 (S36).

In a case where the confidential information acquisition unit 25*a* determines that the corresponding confidential information is in the DB 27*a* (Yes in S34) and the corresponding confidential information can be acquired from the DB 27*a* (Yes in S35), the display control unit 28 determines whether the ID marker is still being displayed on the web screen (S37). Here, in a case where the display control unit 28 determines that the ID marker is still being displayed on the web screen (Yes in S37), the display control unit 28 starts display of the confidential information at a position corresponding to the display position of the ID marker on the web screen (S38).

On the other hand, in a case where the display control unit 28 determines that the ID marker is not displayed on the web screen (No in S37), the processing returns to S31. In a case where the confidential information acquisition unit 25*a* determines that the confidential information of the corresponding ID is not in the DB 27*a* in S34 (No in S34) or in a case where the confidential information acquisition unit 25*a* fails to acquire the confidential information (No in S35), the display control unit 28 displays an error on the system screen unit 14 (S36). Then, the processing returns to S31.

In this way, the smart glasses 20*a* can read an ID marker from a web screen, and display confidential information associated with an ID described in the ID marker.

Third Embodiment

In a case where decryption information of encryption information included in a read ID marker is not in a DB, smart glasses may acquire confidential information from the DB and display the confidential information on the smart glasses. An embodiment in this case will be described as a third embodiment. The same configurations as those of the above-described embodiments are denoted by the same reference signs, and description thereof is omitted.

Configuration Example

Figure 8:
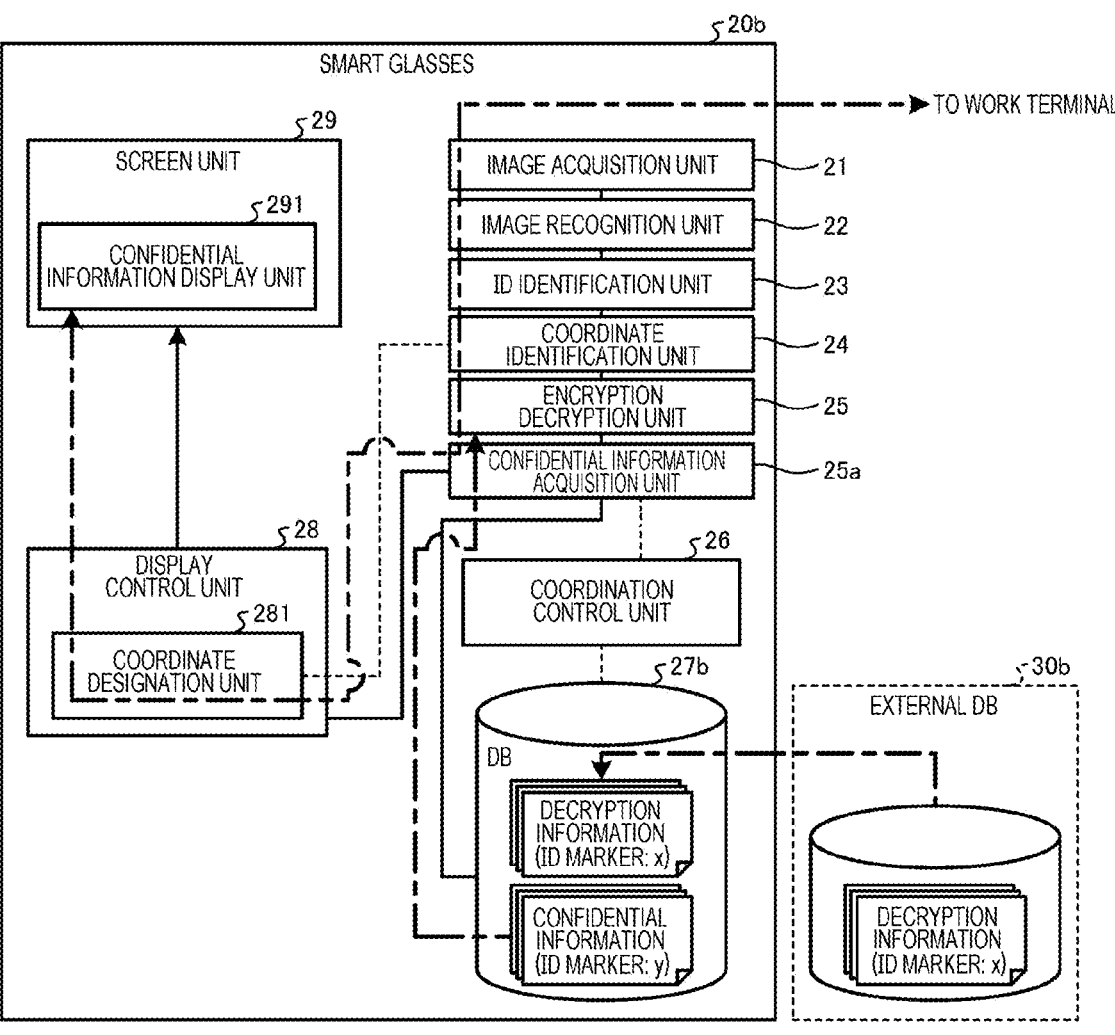
FIG. 8 is a diagram illustrating a configuration example of smart glasses of a third embodiment.

A configuration example of smart glasses 20*b* of the third embodiment is illustrated in FIG. 8. As illustrated in FIG. 8, the smart glasses 20*b* include a DB 27*b*. The smart glasses 20*b* include an encryption decryption unit 25 and a confidential information acquisition unit 25*a*.

The DB 27*b* stores decryption information of encryption information and confidential information. The decryption information is stored in the DB 27*b* in association with an ID of confidential information to be decrypted. Furthermore, the confidential information is also stored in the DB 27*b* in association with the ID of the confidential information.

Note that the decryption information and the confidential information may be stored in the DB 27*b* in the smart glasses 20*b* or may be stored in a device outside the smart glasses 20*b* (external DB 30*b*).

In a case where the encryption decryption unit 25 has failed to acquire decryption information of encryption information associated with an ID included in an ID marker from the DB 27*b*, the smart glasses 20*b* acquire confidential information associated with the ID by the confidential information acquisition unit 25*a*.

Example of Processing Procedure

Figure 9:
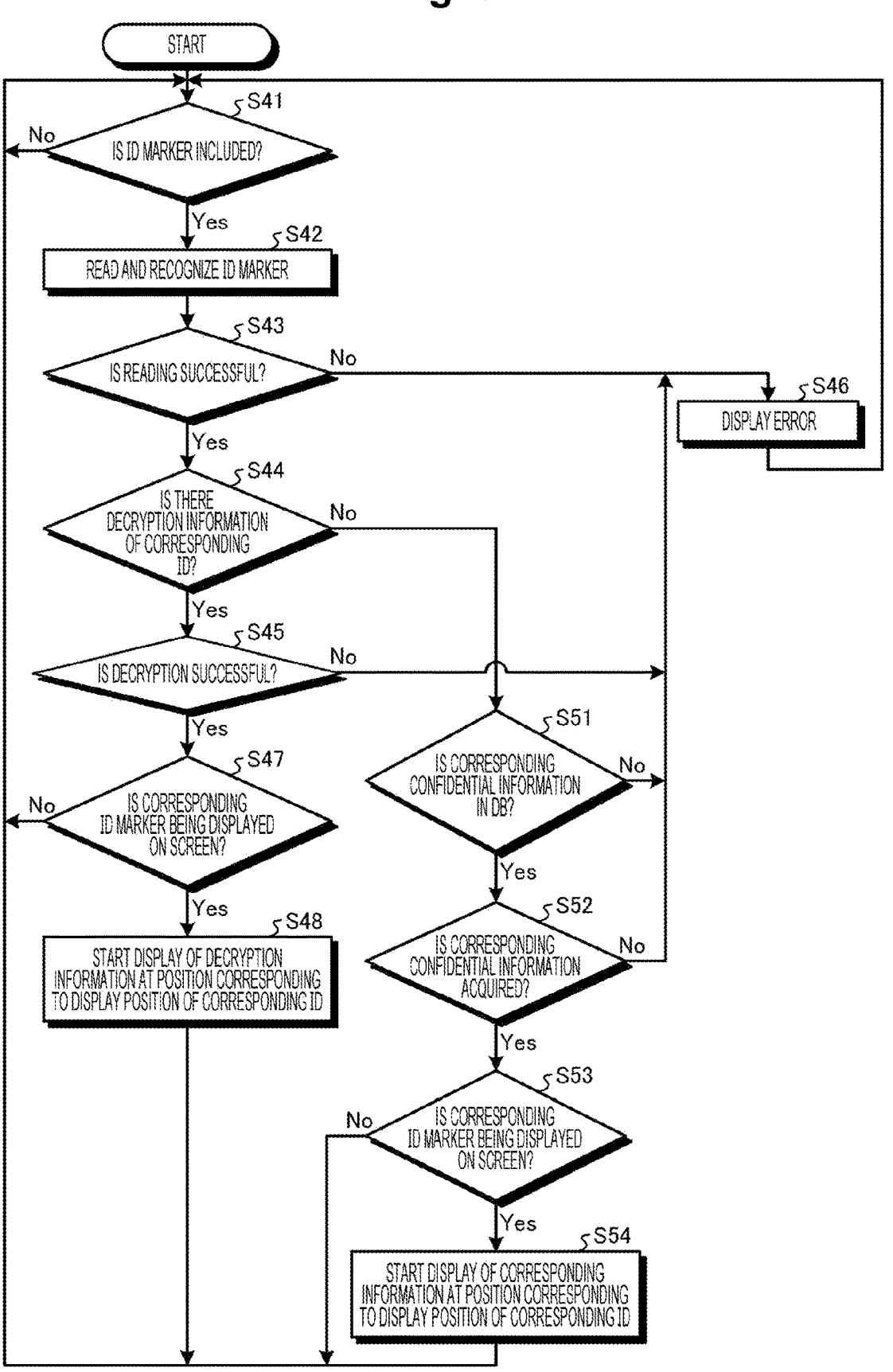
FIG. 9 is a flowchart illustrating an example of a processing procedure of the smart glasses of FIG. 8.

Next, an example of a processing procedure of the smart glasses 20*b* will be described with reference to FIG. 9. Since processing of S41 to S43 of FIG. 9 is similar to processing of S11 to S13 of FIG. 4, description thereof is omitted, and processing will be described from S44 of FIG. 9.

The encryption decryption unit 25 of the smart glasses 20*b* determines whether decryption information of a corresponding ID is in the DB 27*b* (S44), and in a case where it is determined that there is no decryption information for a corresponding ID (No in S44), the processing proceeds to S51. Then, the confidential information acquisition unit 25*a* determines whether corresponding confidential information is in the DB 27*b* (S51). For example, the confidential information acquisition unit 25*a* determines whether confidential information associated with the ID included in an ID marker is in the DB 27*b*.

Then, in a case where the confidential information acquisition unit 25*a* determines that the corresponding confidential information is in the DB 27*b* (Yes in S51), and the corresponding confidential information can be acquired from the DB 27*b* (Yes in S52), processing in and after S53 is performed. Since the processing in and after S53 is similar to processing in and after S37 in FIG. 7, description thereof is omitted.

On the other hand, in a case where the encryption decryption unit 25 determines that decryption information of the corresponding ID is in the DB 27*b* (Yes in S44), processing in and after S45 is performed. Since the processing in and after S45 is similar to processing in and after S15 in FIG. 4, description thereof is omitted.

In this way, in a case where decryption information of encryption information included in a read ID marker is not in the DB 27*b*, the smart glasses 20*b* can acquire confidential information and display the confidential information on the smart glasses 20*b*.

Fourth Embodiment

For example, smart glasses may display a screen including an input field regarding confidential information and transmit information input from the input field to a work terminal. An embodiment in this case will be described as a fourth embodiment. The same configurations as those of the above-described embodiments are denoted by the same reference signs, and description thereof is omitted.

Figure 10:
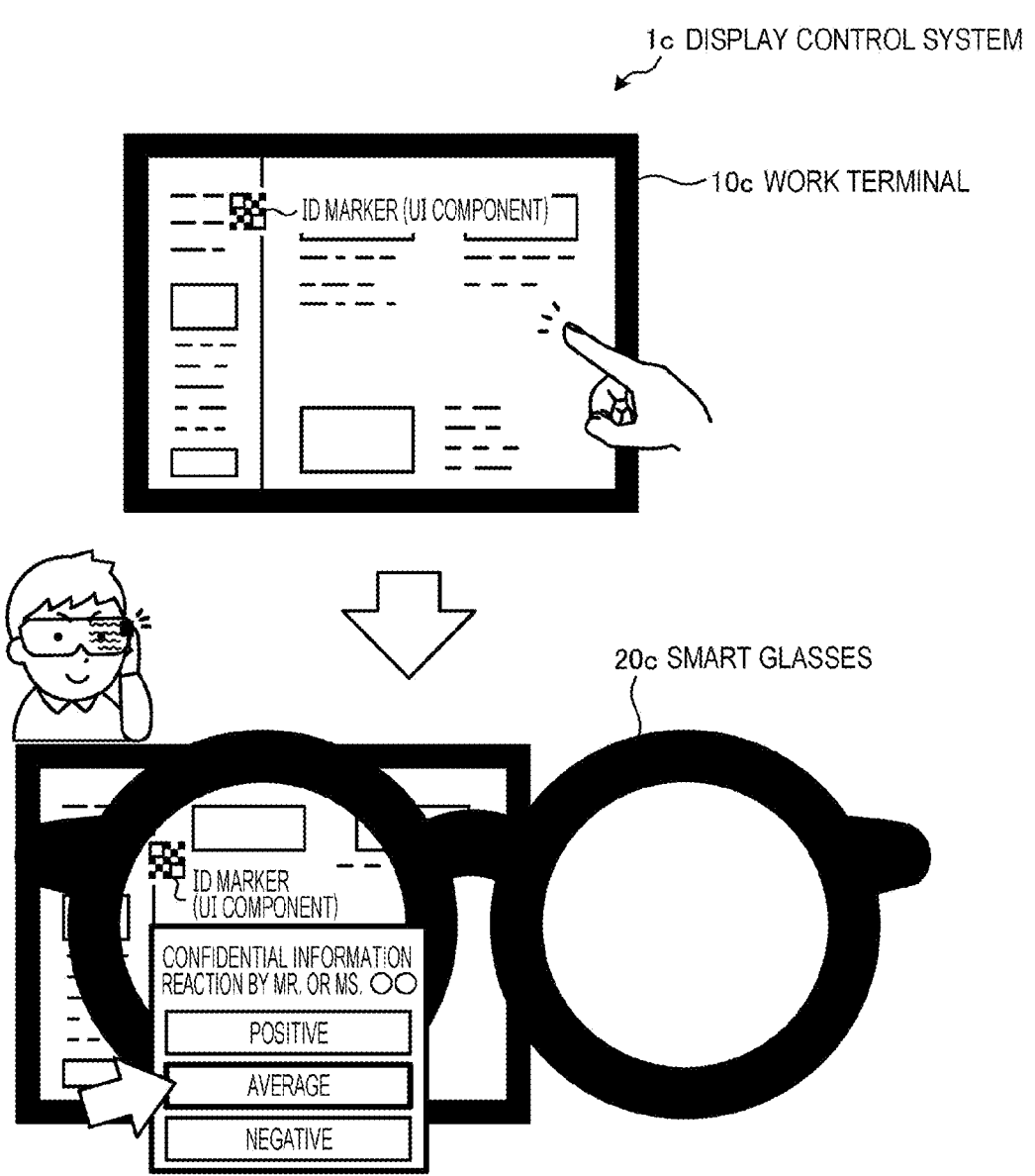
FIG. 10 is a diagram for describing an outline of a display control system of a fourth embodiment.

As illustrated in FIG. 10, a display control system 1*c* of the fourth embodiment includes a work terminal 10*c* and smart glasses 20*c*. When reading an ID marker on the screen of the work terminal 10*c*, the smart glasses 20*c* display, for example, information including a selection input field on the smart glasses 20*c*. Then, the smart glasses 20*c* transmit operation information for the selection input field to the work terminal 10*c*.

For example, when reading a certain ID marker and displaying a selection input field according to the read ID marker, the smart glasses 20*c* receive an operation on the selection input field. Then, the smart glasses 20*c* transmit the received operation as operation information for a UI component of the ID marker in the work terminal 10*c*. Then, the work terminal 10*c* reflects the operation information on the UI component of the ID marker.

Note that the smart glasses 20*c* may receive an operation on the above input field by any operation device. The smart glasses 20*c* may receive an operation on the above information in the form of a gesture of a wearer of the smart glasses 20*c*.

Configuration Example

Figure 11:
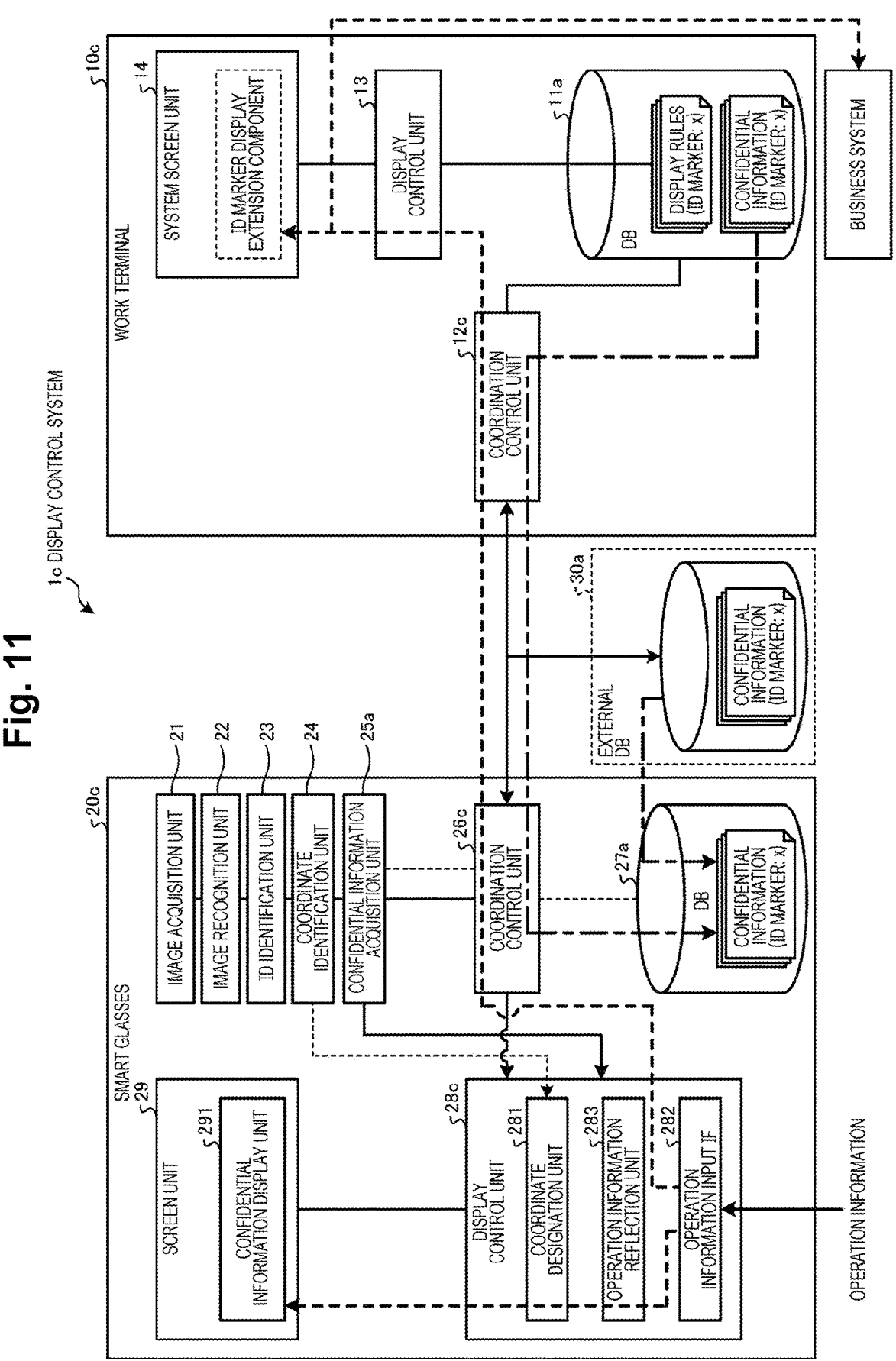
FIG. 11 is a diagram illustrating a configuration example of the display control system of the fourth embodiment.

Next, a configuration example of the display control system 1*c* will be described with reference to FIG. 11. The same configurations as those of the above-described embodiments are denoted by the same reference signs, and description thereof is omitted.

Work Terminal

The work terminal 10*c* includes a coordination control unit 12*c*. The coordination control unit 12*c* transmits confidential information of a DB 11*a* to the smart glasses 20*c*, and also receives operation information regarding the confidential information from the smart glasses 20*c*.

For example, when receiving an ID of confidential information to be operated and operation information from the smart glasses 20*c*, the coordination control unit 12*c* outputs the operation information to the display control unit 13. Thereafter, the display control unit 13 reflects operation content on a UI component of an ID marker corresponding to the ID on a web screen on the basis of the operation information. As a result, the operation content is reflected in a business system (web system) that provides the web screen.

Smart Glasses

The smart glasses 20*c* include a coordination control unit 26*c* and a display control unit 28*c*. The coordination control unit 26*c* stores confidential information received from the work terminal 10*c* in the DB 11*a*, and transmits operation information regarding the confidential information to the work terminal 10*c*.

Furthermore, the display control unit 28*c* displays the confidential information at the coordinate position on a screen unit 29 designated by a coordinate designation unit 281. Here, in a case where an input operation is received in the confidential information from a wearer of the smart glasses 20*c*, an input field (see, for example, the selection input field illustrated in FIG. 9) is displayed on a confidential information display unit 291. Then, the display control unit 28*c* displays an operation result for the input field on the confidential information display unit 291.

The display control unit 28c includes an operation information input interface (IF) 282 and an operation information reflection unit 283 in addition to the above-described coordinate designation unit 281.

The operation information input IF 282 provides an interface that receives input of operation information for confidential information from a wearer of the smart glasses 20c. The operation information reflection unit 283 reflects operation information for confidential information received by the operation information input IF 282 on the confidential information display unit 291. The operation information reflection unit 283 transmits operation information for confidential information received by the operation information input IF 282 to the work terminal 10 via the coordination control unit 26c.

Example of Processing Procedure

Next, an example of a processing procedure of the display control system 1c will be described with reference to FIG. 12. Since processing of S61 to S68 of FIG. 12 is similar to processing of S31 to S38 of FIG. 7, description thereof is omitted, and processing from S69 of FIG. 12 will be described.

Figure 12:
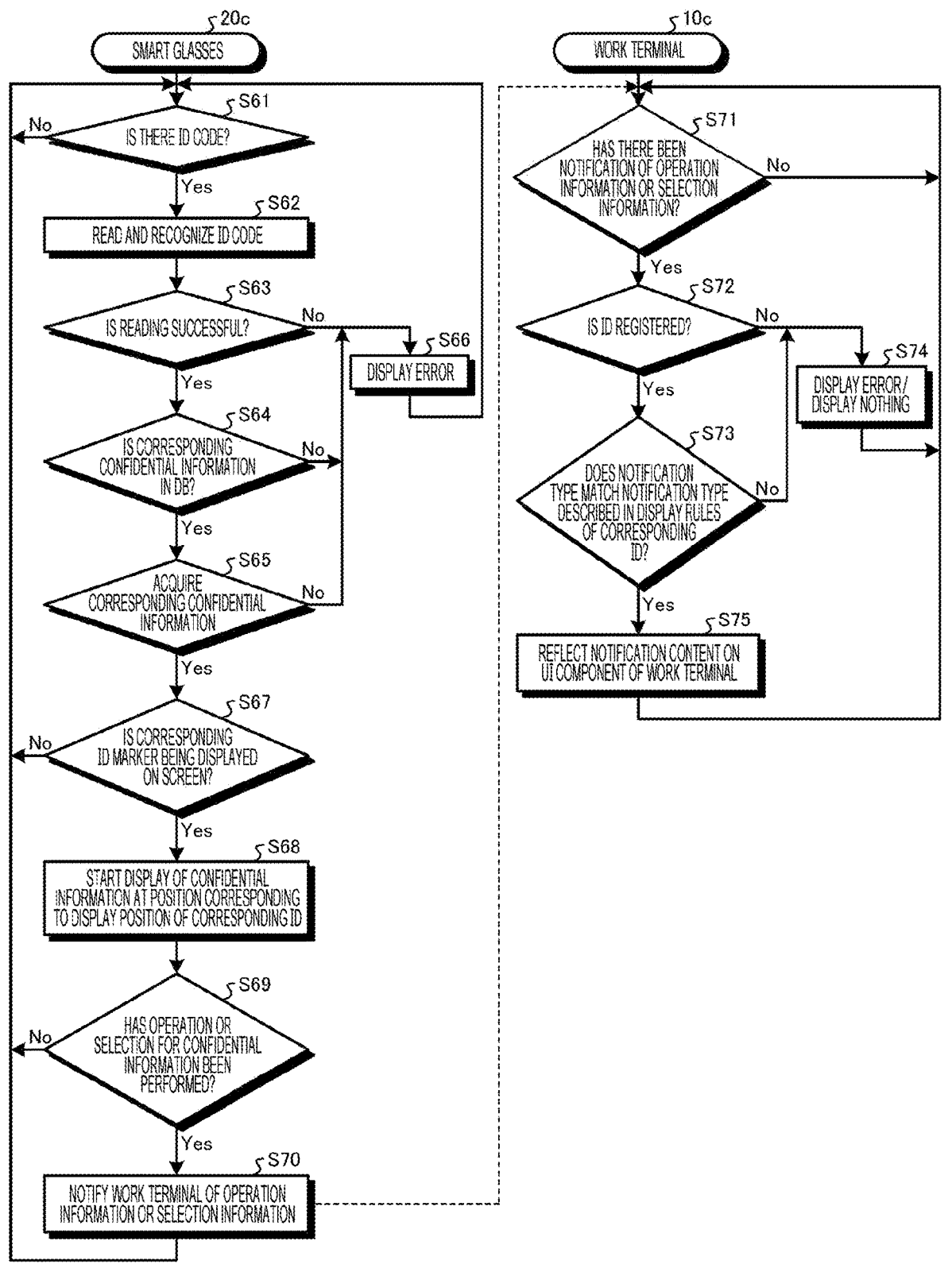
FIG. 12 is a sequence diagram illustrating an example of a processing procedure of the display control system of FIG. 11.

After S68 in FIG. 12, the operation information input IF 282 of the smart glasses 20c determines whether it is determined that an operation or a selection for confidential information has been performed (S69). Here, in a case where the operation information input IF 282 determines that an operation or a selection for the confidential information has been performed (Yes in S69), the operation information reflection unit 283 notifies the work terminal 10c of operation information or selection information for the confidential information via the coordination control unit 26c (S70). Note that the operation information or the selection information in the notification for the work terminal 10c includes the ID of the confidential information that is an operation or selection target. Thereafter, the processing returns to S61.

On the other hand, in a case where the operation information input IF 282 determines that an operation or a selection for the confidential information has not been performed (No in S69), the processing returns to S61.

After S70, in a case where the display control unit 13 of the work terminal 10c determines that there has been notification of the operation information or the selection information from the smart glasses 20c (Yes in S71), whether an ID included in the notification is an ID registered in the DB 11a is determined (S72). Here, in a case where the display control unit 13 determines that the ID included in the notification is an ID registered in the DB 11a (Yes in S72), whether the type of the notification matches the notification type described in display rules of the ID is checked (S73). In a case of determining that the type of the notification matches the notification type described in the display rules of the ID (Yes in S73), the display control unit 13 reflects the notification content on a UI component of the work terminal 10c (S75). For example, the display control unit 13 reflects the notification content on a UI component corresponding to the ID displayed on the system screen unit 14.

On the other hand, in a case where the display control unit 13 determines that there is no notification of the operation information or the selection information from the smart glasses 20c (No in S71), the processing returns to S71. In a case of determining that the ID included in the notification is not an ID registered in the DB 11a (No in S72) or in a case of determining that the type of the notification does not match the notification type described in the display rules of the ID (No in S73), the display control unit 13 displays an error on the system screen unit 14 or nothing is displayed (S74), and the processing returns to S71.

In this way, the smart glasses 20c can reflect the content of an operation or a selection for confidential information displayed on the screen unit 29 of the smart glasses 20c on the work terminal 10c.

Application Example 1

Note that an object to which an ID marker is given in the display control system 1c may be other than a web screen displayed on the work terminal 10c. For example, an object to which an ID marker is given may be a management object of the work terminal 10c. An example of this case will be described with reference to FIG. 13.

Here, a case where the management object by the work terminal 10c is airplane tires is considered. In this case, as illustrated in FIG. 13, ID markers are attached to the tires themselves.

A mechanic of the airplane checks the condition of the tires with the smart glasses 20c on ((1)). Here, for example, in a case where the mechanic finds a heavily worn tire, the mechanic reads an ID marker given to the tire using the smart glasses 20c, and the smart glasses 20c display information associated with the ID marker (information of a corresponding ID). For example, the smart glasses 20c display information for receiving selection input regarding the condition of the tire on the smart glasses 20c ((2)).

Then, the mechanic inputs information regarding the condition of the tire on the displayed information by any operation device (selection/input by any operation device). For example, the mechanic performs selective input such as "heavily worn immediate order" as the condition of the tire. Thereafter, the smart glasses 20c transfer the above input result to the work terminal 10c ((3)).

When receiving the input result from the smart glasses 20c, the work terminal 10c reflects the input result in a system used by the work terminal 10c. Note that IDs (IDs of components) indicated by ID markers and IDs of components managed by the system are associated with each other. Therefore, the work terminal 10c reflects the input result in information associated with the ID in the system using the ID of the component included in the input result as a key.

In this way, a worker can reflect the condition of a management target object in the system.

Application Example 2

Figure 14:
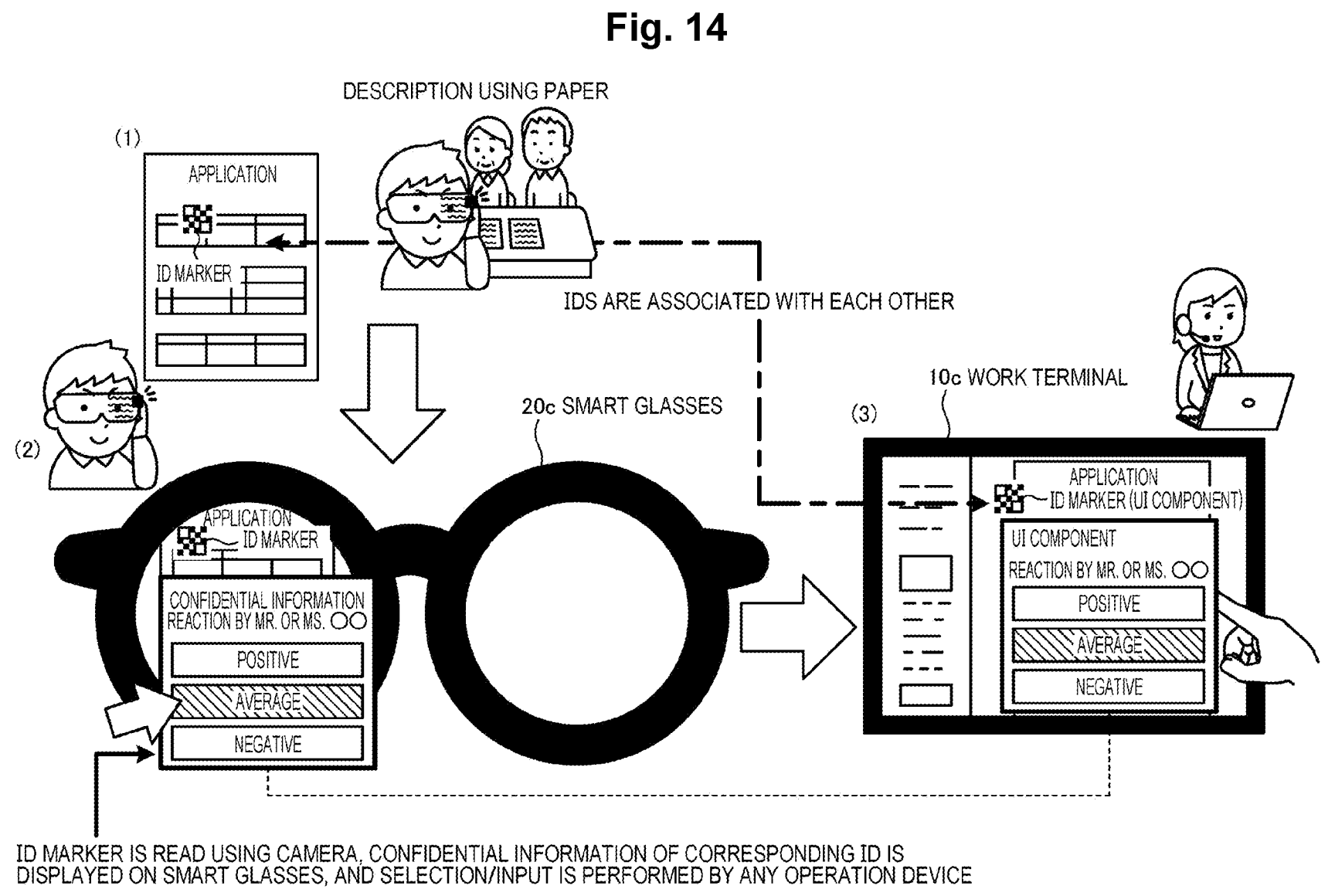

The object to be managed by the work terminal 10c may be a document (paper). In this case, as illustrated in FIG. 14, an ID marker is given to the document itself.

First, a worker explains to a customer using the document with the smart glasses 20c on ((1)). Here, for example, in a case where the worker desires to input reaction by the customer or the like, the worker reads the ID marker given to the document using the smart glasses 20c, and the smart glasses 20c display information associated with the ID marker (information of a corresponding ID). For example, the smart glasses 20c display information for receiving selection input regarding the reaction of the customer on the smart glasses 20c ((2)).

Then, the worker performs input regarding the reaction of the customer on the displayed information by any operation device (selection/input by any operation device). For example, the worker performs selection input such as "average" as the reaction of the customer. Thereafter, the smart glasses 20*c* transfer the above input result to the work terminal 10*c* ((3)).

When receiving the input result from the smart glasses 20*c*, the work terminal 10*c* reflects the input result in a system that manages documents and information regarding customers. Note that IDs (IDs of documents) indicated by ID markers and IDs of documents managed by the above system are associated with each other. Therefore, the work terminal 10*c* reflects the input result in information associated with the ID in the above system using the ID included in the input result as a key.

In this way, a worker can reflect information regarding a customer to whom explanation has been performed using a document in the system.

System Configuration and Others

In addition, each component of each unit illustrated in the drawings is functionally conceptual and does not necessarily need to be physically configured as illustrated in the drawings. In other words, a specific form of distribution and integration of each device is not limited to the illustrated form, and all or part thereof can be functionally or physically distributed and integrated in any unit according to various loads, usage conditions, and the like. Further, all or any part of each processing function performed in each device can be implemented by a CPU and a program to be executed by the CPU or can be implemented as hardware by wired logic.

In addition, in the processing described in the above-described embodiments, all or part of processing described as being automatically performed may be manually performed, or all or part of processing described as being manually performed may be automatically performed by a known method. In addition to the above, the processing procedures, the control procedures, the specific names, and the information including various kinds of data and parameters that are illustrated in the above literatures and drawings can be changed as appropriate, unless otherwise specified.

Program

The smart glasses 20 described above can be implemented by installing a program (display control program) in a desired computer as package or online software. For example, an information processing device can be caused to function as the smart glasses 20 by causing the information processing device to execute the above program. Here, the information processing device also includes mobile communication terminals such as a smartphone, a mobile phone, and a personal handy-phone system (PHS) and terminals such as a personal digital assistant (PDA).

Figure 15:
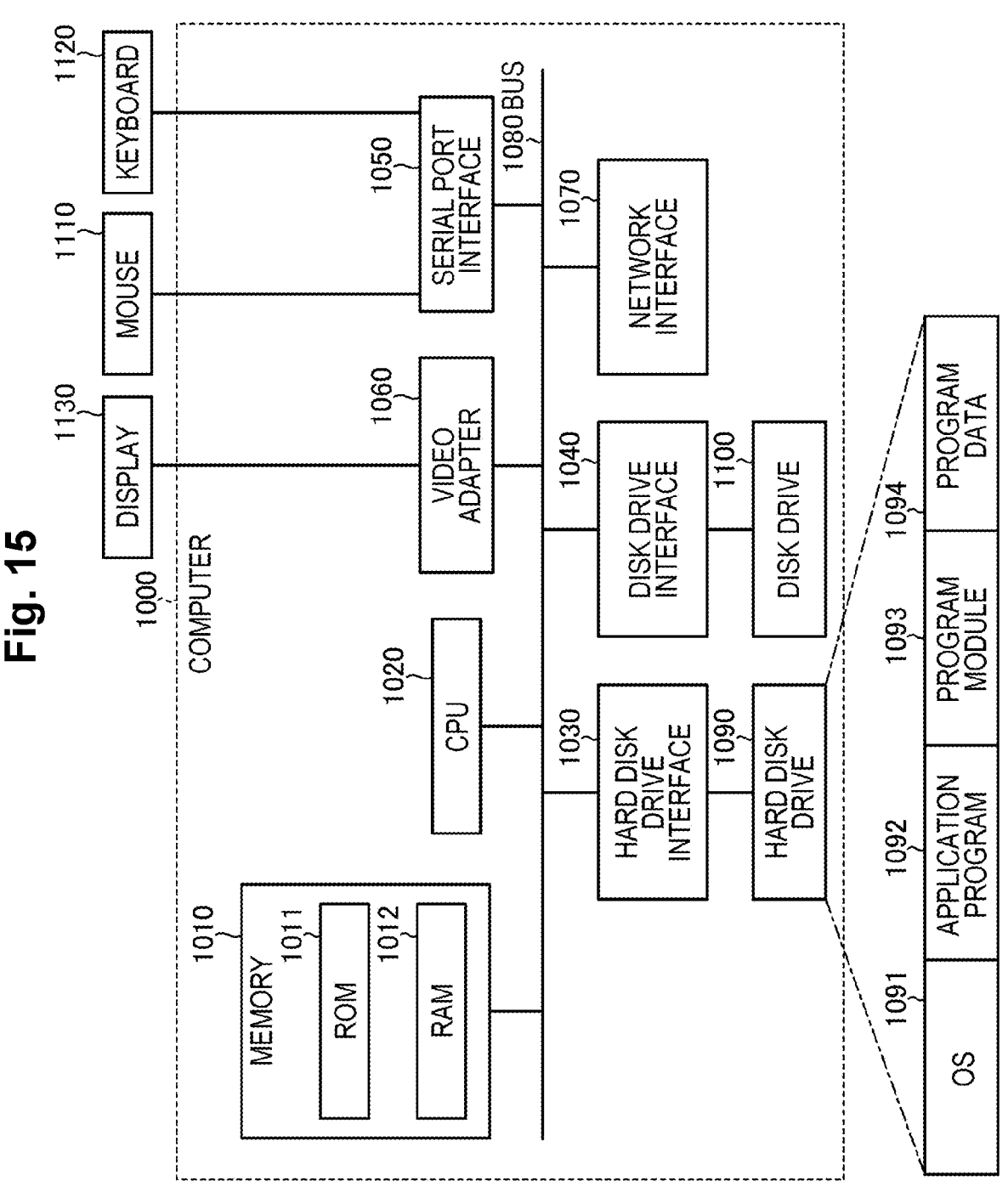
FIG. 15 is a diagram illustrating a configuration example of a computer that executes a display program.

FIG. 15 is a diagram illustrating an example of a computer that executes the display control program. A computer 1000 includes, for example, a memory 1010 and a CPU 1020. Furthermore, the computer 1000 also includes a hard disk drive interface 1030, a disk drive interface 1040, a serial port interface 1050, a video adapter 1060, and a network interface 1070. These units are connected to each other via a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected with, for example, a display 1130.

The hard disk drive 1090 stores, for example, an OS 1091, an application program 1092, a program module 1093, and program data 1094. That is, a program that defines each processing executed by the smart glasses 20 is implemented as the program module 1093 in which a code executable by the computer is written. The program module 1093 is stored in, for example, the hard disk drive 1090. For example, the program module 1093 executing similar processing to the functional configurations in the smart glasses 20 is stored in the hard disk drive 1090. The hard disk drive 1090 may be replaced with a solid state drive (SSD).

Data to be used in the processing of the above embodiments is stored in, for example, the memory 1010 or the hard disk drive 1090 as the program data 1094. The CPU 1020 reads the program module 1093 and the program data 1094 stored in the memory 1010 and the hard disk drive 1090 to the RAM 1012 as necessary and executes the program module 1093 and the program data 1094.

The program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). The program module 1093 and the program data 1094 may be read by the CPU 1020 from another computer via the network interface 1070.

REFERENCE SIGNS LIST

1, 1*a*, 1*c* Display control system
10, 10*a*, 10*c* Work terminal
11, 11*a*, 27, 27*a* DB
12, 12*c*, 26, 26*c* Coordination control unit
13, 28, 28*c* Display control unit
14 System screen unit
20, 20*a*, 20*b*, 20*c* Smart glasses (mobile terminal)
21 Image acquisition unit
22 Image recognition unit
23 ID identification unit
24 Coordinate identification unit
25 Encryption decryption unit (acquisition unit)
25*a* Confidential information acquisition unit (acquisition unit)
281 Coordinate designation unit
282 Operation information input IF
283 Operation information reflection unit
291 Confidential information display unit

The invention claimed is:
1. A display control system comprising a processor configured to execute operations comprising:
displaying an identification marker indicating confidential information in an allocation area of the confidential information on a web screen, wherein the allocation area indicates an area where the confidential information on the web screen using an extended User Interface (UI) is displayed;
acquiring an image of the web screen;
identifying the identification marker displayed on the web screen using an acquired image of the web screen;
acquiring the confidential information corresponding to the read identification marker from a database that stores the confidential information corresponding to the identification marker, wherein acquiring the confidential information further comprises acquiring the confidential information by acquiring decryption information for decrypting encryption information indicated by the identified identification marker from the database, and decrypting the encryption information using the acquired decryption information, wherein the acquired decryption information is controlled by a user's gestures; and upon successfully decrypting the encryption information, displaying the acquired the confidential information.

2. The display control system according to claim 1, wherein the displaying the identification marker further comprises displaying the identification marker indicating the encryption information of the confidential information in the allocation area of the confidential information on the web screen.

3. The display control system according to claim 1, wherein the displaying the identification marker further comprises displaying the identification marker indicating identification information of the confidential information in an allocation area of the confidential information on the web screen, and the acquiring the confidential information further comprises acquiring the confidential information corresponding to identification information indicated by the identified identification marker from the database.

4. The display control system according to claim 1, wherein the acquiring the confidential information further comprises acquiring the confidential information corresponding to the identified identification marker from the database in a case where decryption information for decrypting encryption information indicated by the identified identification marker is not in the database.

5. The display control system according to claim 1, wherein the displaying the confidential information further comprises displaying the confidential information at a position within a predetermined distance from a position of the identification marker when the web screen is viewed on a basis of a position of the identification marker on the web screen identified from the image of the web screen.

6. The display control system according to claim 1, wherein the displaying the confidential information further comprises displaying the confidential information including an input field for receiving an input operation, and the processor further configured to execute operations comprising transmitting a result of the input operation received in the input field as operation information regarding the confidential information corresponding to the identification marker.

7. The display control system according to claim 1, wherein the displaying the acquired confidential information further comprises displaying the acquired confidential information on a screen of a mobile terminal, the mobile terminal includes a camera, and the acquiring the image of the web screen further comprises capturing the image of the web screen using the camera.

8. A computer implemented method for controlling display, comprising:

displaying an identification marker indicating the confidential information in an allocation area of the confidential information on a web screen;

acquiring an image of the web screen;

reading an identification marker displayed on the web screen using an acquired image;

acquiring confidential information corresponding to the read identification marker from a database that stores the confidential information corresponding to the identification marker, wherein acquiring the confidential information further comprises:

acquiring the confidential information by acquiring decryption information for decrypting encryption information indicated by the identified identification marker from the database, and decrypting the encryption information using the acquired decryption information, wherein the acquired decryption information is controlled by a user's gestures; and upon successfully decrypting the encryption information, displaying the acquired confidential information.

9. The computer implemented method according to claim 8, wherein displaying the identification marker further comprises displaying the identification marker indicating encryption information of confidential information in the allocation area of the confidential information on the web screen.

10. The computer implemented method according to claim 9, wherein the acquiring the confidential information further comprises acquiring the confidential information corresponding to the identified identification marker from the database in a case where decryption information for decrypting encryption information indicated by the identified identification marker is not in the database.

11. The computer implemented method according to claim 8, wherein displaying the identification marker further comprises displaying the identification marker indicating identification information of the confidential information in the allocation area of the confidential information on the web screen, and the acquiring the confidential information further comprises acquiring the confidential information corresponding to identification information indicated by the identified identification marker from the database.

12. The computer implemented method according to claim 8, wherein displaying the confidential information further comprises displaying the confidential information at a position within a predetermined distance from a position of an identification marker when the web screen is viewed on a basis of a position of the identification marker on the web screen identified from the image of the web screen.

13. The computer implemented method according to claim 8, wherein displaying the confidential information further comprises displaying the confidential information including an input field for receiving an input operation, and the method further comprising transmitting a result of the input operation received in the input field as operation information regarding confidential information corresponding to the identification marker.

14. The computer implemented method according to claim 8, wherein displaying the acquired confidential information further comprises displaying the acquired confidential information on a screen of a mobile terminal, the mobile terminal includes a camera, and the acquiring the image of the web screen further comprises capturing the image of the web screen using the camera.

15. A computer-readable non-transitory recording medium storing a computer-executable program instructions that when executed by a processor cause a computer system to execute operations comprising:

acquiring an image of a web screen displayed by a work terminal;

identifying an identification marker displayed on the web screen using an acquired image of the web screen;

acquiring confidential information corresponding to the identified identification marker from a database that stores the confidential information corresponding to the identification marker, wherein acquiring the confidential information further comprises:

acquiring the confidential information by acquiring decryption information for decrypting encryption information indicated by the identified identification marker from the database, and decrypting the encryption information using the acquired decryption information, wherein the acquired decryption information is controlled by a user's gestures; and upon successfully decrypting the encryption information, displaying the acquired confidential information.

16. The computer-readable non-transitory recording medium according to claim 15, wherein displaying the identification marker further comprises displaying the identification marker indicating encryption information of confidential information in the allocation area of the confidential information on the web screen.

17. The computer-readable non-transitory recording medium according to claim 16, wherein the acquiring confidential information further comprises acquiring the confidential information corresponding to the identified identification marker from the database in a case where decryption information for decrypting encryption information indicated by the identified identification marker is not in the database.

18. The computer-readable non-transitory recording medium according to claim 15, wherein displaying the identification marker further comprises displaying the identification marker indicating identification information of confidential information in the allocation area of the confidential information on the web screen, and acquiring the confidential information further comprises acquiring confidential information corresponding to identification information indicated by the identified identification marker from the database.

19. The computer-readable non-transitory recording medium according to claim 15, wherein displaying the confidential information further comprises displaying the confidential information at a position within a predetermined distance from a position of an identification marker when the web screen is viewed through the screen unit on a basis of a position of the identification marker on the web screen identified from the image of the web screen.

20. The computer-readable non-transitory recording medium according to claim 15, wherein displaying the confidential information further comprises displaying the confidential information including an input field for receiving an input operation, displaying the acquired confidential information further comprises displaying the acquired confidential information on a screen of a mobile terminal, the mobile terminal includes a camera, and the acquiring the image of the web screen further comprises capturing the image of the web screen using the camera, and the computer-executable program instructions when executed further causing the computer system to execute operations comprising transmitting a result of the input operation received in the input field as operation information regarding confidential information corresponding to the identification marker.

* * * * *